(12) United States Patent
An et al.

(10) Patent No.: US 7,446,922 B2
(45) Date of Patent: Nov. 4, 2008

(54) INTERDIGITATING DIFFRACTIVE LIGHT MODULATOR

(75) Inventors: Seung Do An, Kyunggi-do (KR); Yoon Shik Hong, Kyunggi-do (KR); Seung Heon Han, Seoul (KR); Hyun Ju Yi, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 263 days.

(21) Appl. No.: 11/244,605

(22) Filed: Oct. 6, 2005

(65) Prior Publication Data

US 2006/0146392 A1 Jul. 6, 2006

(30) Foreign Application Priority Data

Jan. 5, 2005 (KR) ............... 10-2005-0000895

(51) Int. Cl.
G02B 26/00 (2006.01)
(52) U.S. Cl. ............... 359/237; 359/231; 359/558
(58) Field of Classification Search ............... 359/231, 359/237, 566, 571, 572, 573, 230, 558, 569, 359/578, 579, 584; 310/308, 309; 73/504.12, 73/504.14, 504.16
See application file for complete search history.

(56) References Cited

U.S. PATENT DOCUMENTS 6,381,062 B1 * 4/2002 Kowarz et al. ............... 359/291

FOREIGN PATENT DOCUMENTS

WO    WO 03/055788 A1    10/2003

* cited by examiner

*Primary Examiner*—Ricky L Mack
*Assistant Examiner*—Tuyen Q Tra
(74) *Attorney, Agent, or Firm*—Christensen O'Connor Johnson Kindness PLLC

(57) ABSTRACT

Disclosed herein is an interdigitation-type diffractive light modulator. In the interdigitation-type diffractive light modulator of the present invention, each of a pair of ribbons has a plurality of diffractive branches which are arranged in a comb shape, and the diffractive branches of the ribbons interdigitate with each other. Furthermore, the respective ribbons moves upwards and downwards or, alternatively, one ribbon moves upwards and downwards, so that the diffractive branches of the ribbons which interdigitate with each other form a stepped structure, thus diffracting incident light.

6 Claims, 15 Drawing Sheets

INTERDIGITATING DIFFRACTIVE LIGHT MODULATOR

BACKGROUND OF THE INVENTION

1. Field of the Invention

The present invention relates generally to diffractive light modulators and, more particularly, to an interdigitation-type diffractive light modulator in which each of a pair of ribbons has a plurality of diffractive branches arranged in a comb shape, and in which the diffractive branches of the ribbons interdigitate with each other, and the respective ribbons move upwards and downwards or, alternatively, one ribbon moves upwards and downwards, so that the diffractive branches of the ribbons which interdigitate with each other form a stepped structure, thus diffracting incident light.

2. Description of the Related Art

Recently, with the development of micro-technology, MEMS (micro-electro-mechanical systems) devices and micro-apparatuses to assemble the MEMS devices are gaining popularity.

The MEMS devices form a microstructure on a substrate, such as a silicon substrate and a glass substrate, in which an actuator to generate a mechanical actuating force and a semiconductor integrated circuit to control the actuator are electrically and mechanically assembled together. The fundamental feature of the MEMS device is that the actuator having a mechanical structure is provided at a predetermined position of the MEMS device and is electrically operated by using Coulomb force generated between electrodes.

FIGS. 1 and 2 show representative optical MEMS devices for light activated switches and light modulator elements using the reflection or diffraction of light.

An optical MEMS device 1 shown in FIG. 1 includes a substrate 2, a substrate-side electrode 3 which is placed on the substrate 2, and a cross-beam 6 which has an actuator-side electrode 4 that is arranged parallel to the substrate-side electrode 3. The actuator-side electrode 4 of the cross-beam 6 corresponds to the substrate-side electrode 3 of the substrate 2. The optical MEMS device further includes a support 7 which is coupled to an end of the cross-beam 6 to support the cross-beam 6. The cross-beam 6 is electrically insulated from the substrate-side electrode 3 by a gap 8 defined between them.

In this optical MEMS device 1, the cross-beam 6 is moved by electrostatic attraction which is generated by electric potential applied to the substrate-side electrode 3 and the actuator-side electrode 4. For example, as shown by the real line and the broken line in FIG. 1, the cross-beam 6 moves from a state of being parallel to the substrate-side electrode 3 to a state of being inclined with respect to the substrate-side electrode 3.

Another optical MEMS device 11 is shown in FIG. 2. This optical MEMS device 11 includes a substrate 12, a substrate-side electrode 13 which is placed on the substrate 12, and a bridge-shaped beam 14 which is laid across the substrate-side electrode 13. The bridge-shaped beam 14 is electrically insulated from the substrate-side electrode 13 by a gap 10 defined between them.

The bridge-shaped beam 14 has a bridge body 15 and an actuator-side electrode 16 which is provided on the bridge body 15 parallel to the substrate-side electrode 13 to correspond to the substrate-side electrode 13.

In this optical MEMS device 11, according to electric potential applied to the substrate-side electrode 13 and the actuator-side electrode 16, the bridge-shaped beam 14 is moved by electrostatic attraction generated between the substrate-side electrode 13 and the actuator-side electrode 16. That is, the bridge-shaped beam 14 moves from a state of being parallel to the substrate-side electrode 13 to a state of being bent toward the substrate-side electrode 13.

These optical MEMS devices 1 and 11 may be used as light activated switches which serve to detect light reflected in a predetermined direction using the phenomenon that, when light is radiated onto a surface of the actuator-side electrode 4 or 16 serving as a light reflective surface, the direction of the reflected light varies according to the location of the beam 6 or 14.

Alternatively, the optical MEMS devices 1 and 11 may be used as light modulator elements to modulate light intensity. In the use of reflection of light, the light intensity is modulated by vibrating the beam 6 or 14 and varying the amount of light reflected in a predetermined direction per hour.

To use diffraction of light, a plurality of beams 6 or 14 is arranged parallel to the substrate-side electrode 3 or 13 to form a light modulator element. For example, alternate beams 6 or 14 move toward or away from the substrate-side electrode 3 or 13, so as to change the height of the actuator-side electrodes serving even as the light reflective surface, thus diffracting incident light. The intensity of light, reflected by the actuator-side electrodes, is modulated through the above-mentioned light diffraction. The light modulation by this light modulator element is a spatial modulation.

FIG. 3a and FIG. 3b shows the construction of a GLV (grating light valve) device which is a light intensity control unit, that is, a light modulator, and which was developed by SLM (silicon light machine) corporation.

As shown in FIG. 3a and FIG. 3b, the GLV device 21 includes a substrate-side electrode 23 which is placed on an insulated substrate 22 such as a glass substrate, and a plurality of beams 24 ($24_1$, $24_2$, $24_3$, $24_4$, $24_5$ and $24_6$) which are laid across the substrate-side electrode 23 parallel to each other in a bridge shape.

Each beam 24 including both a bridge body 25 and an actuator-side electrode 26, which is provided on the bridge body 25 and serves as a reflective surface, is called a ribbon.

When a small amount of voltage is applied between the substrate-side electrode 23 and the actuator-side electrodes 26 serving as the reflective surface, alternate beams 24 are moved towards the substrate-side electrode 23 by electrostatic force. When the application of voltage is stopped, the beams 24 are moved away from the substrate-side electrode 23, thus being returned to the initial state.

In the GLV device 21, the height of alternate actuator-side electrodes 26 is varied by the movement of the alternate beams 24 towards or away from the substrate-side electrode 23. The diffraction of light modulates the intensity of light reflected by the actuator-side electrodes 26 (here, one light support is radiated to all of the six beams 24).

In conventional GLV devices, because, in the case in which only two ribbons form one pixel, diffraction efficiency is low, four or six ribbons form one pixel. Furthermore, to increase the diffraction efficiency of a GLV device, more ribbons are required. However, this increases manufacturing costs and requires a large area. Thus, conventional GLV devices have reached the limit of miniaturization.

Furthermore, in conventional GLV devices, because light is diffracted towards ribbons, when the ribbons are arranged in a linear array, it is difficult to distinguish between a zero order diffraction and a first order diffraction.

SUMMARY OF THE INVENTION

Accordingly, the present invention has been made keeping in mind the above problems occurring in the prior art, and an object of the present invention is to provide an interdigitation-type diffractive light modulator which is able to enhance diffraction efficiency despite using only one pair of ribbons.

Another object of the present invention is to provide an interdigitation-type diffraction light modulator which increases the diffraction angle of diffractive light, thus easily distinguishing between a zero order diffraction and a first order diffraction.

In an aspect, the present invention provides an interdigitation-type diffractive light modulator, including: a substrate; and a pair of ribbons each having a bar shape. Each of the ribbons is suspended at an intermediate portion thereof above the substrate and has a plurality of diffractive branches arranged along the intermediate portion of each of the ribbons in a comb shape such that the diffractive branches of the pair of ribbons forming the comb shapes interdigitate with each other, with a reflective surface provided on an upper surface of each of the diffractive branches. The interdigitation-type diffractive light modulator further includes an actuating unit to move the intermediate portion of either of the pair of ribbons upwards and downwards, so that the diffractive branches of the ribbon, which interdigitate with the diffractive branches of a remaining ribbon, move between a first position to reflect incident light and a second position to diffract incident light.

In another aspect, the present invention provides an interdigitation-type diffractive light modulator, including: a substrate; and a pair of ribbons each having a bar shape. Each of the ribbons is suspended at an intermediate portion thereof above the substrate and has a plurality of diffractive branches arranged along the intermediate portion of each of the ribbons such that the diffractive branches protrude outwards from both sidewalls of the intermediate portion of the ribbon and form a fishbone shape, with a reflective surface provided on an upper surface of each of the diffractive branches, wherein parts of the diffractive branches of the pair of ribbons which protrude toward each other from the intermediate portions of the ribbons interdigitate with each other. The interdigitation-type diffractive light modulator further includes an actuating unit to move the intermediate portion of either of the ribbons upwards and downwards, so that the diffractive branches of the ribbon, which interdigitate with the diffractive branches of a remaining ribbon, move between a first position to reflect incident light and a second position to diffract incident light.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
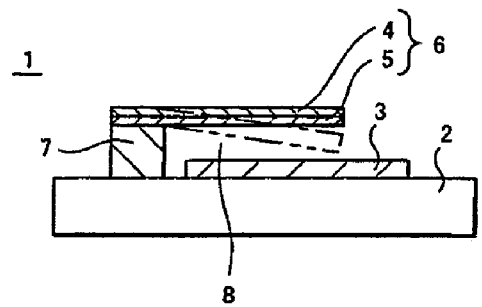
FIGS. 1 and 2 show conventional representative optical MEMS devices used in light activated switches and light modulator elements using reflection or diffraction of light.
Figure 2:
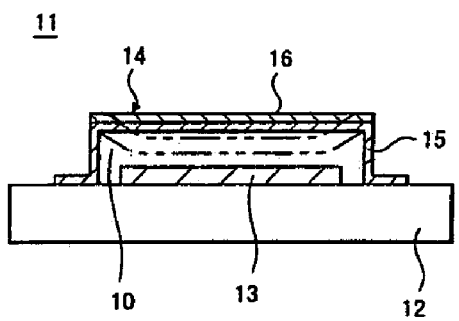
Figure 3A:
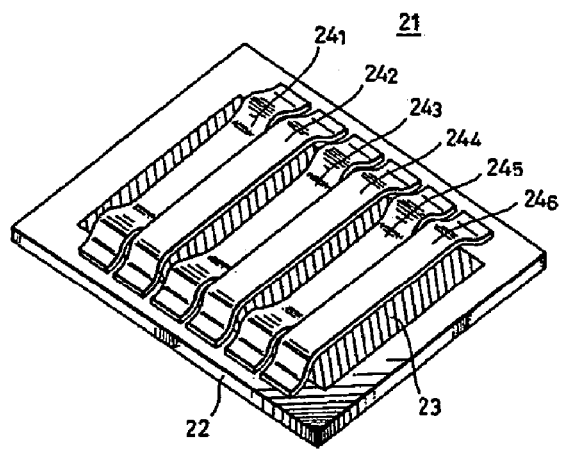
FIG. 3a and FIG. 3b shows the construction of a GLV (grating light valve) device which is a light intensity control unit, that is, a light modulator, and which was developed by SLM (silicon light machine) corporation.
Figure 3B:
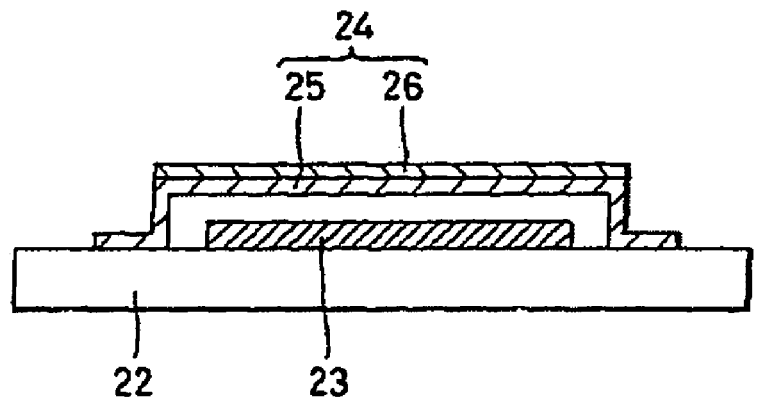
Figure 4:
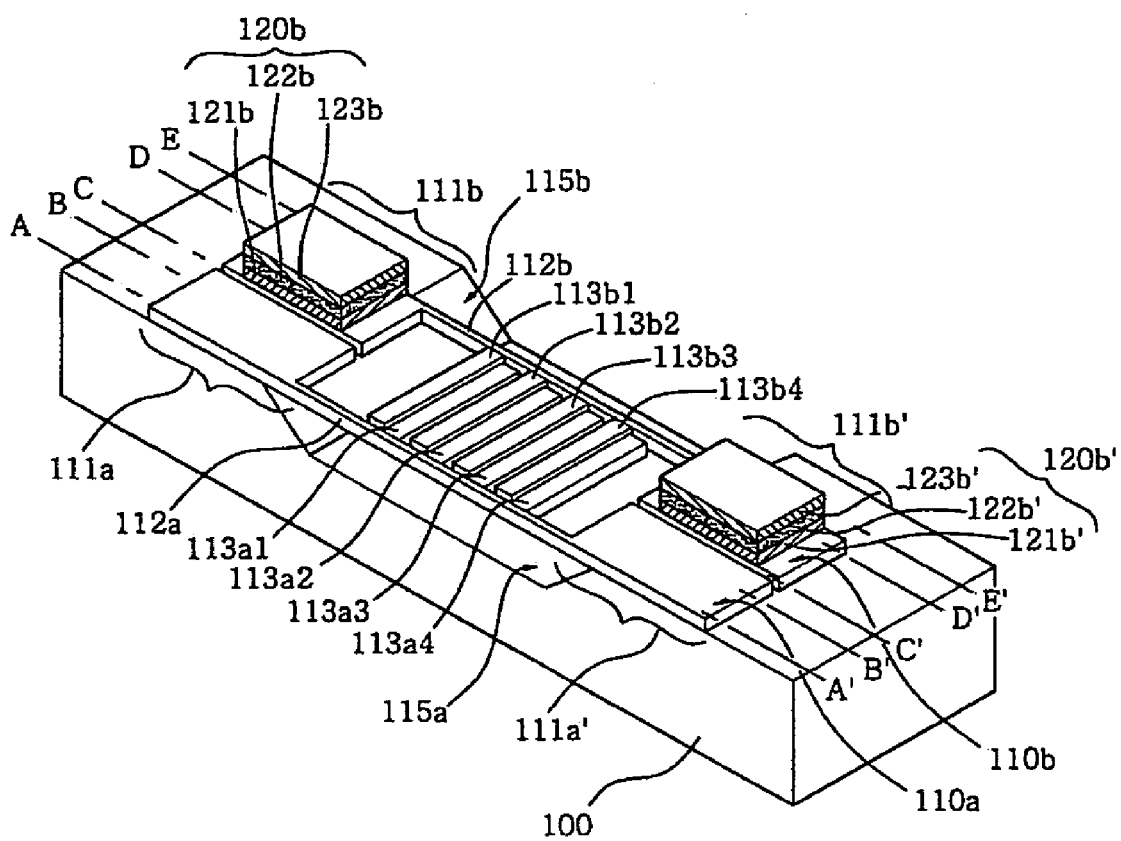
FIG. 4 is a perspective view of an interdigitation-type diffractive light modulator, according to a first embodiment of the present invention.

FIG. 4 is a perspective view of an interdigitation-type diffractive light modulator, according to a first embodiment of the present invention.

Referring to FIG. 4, the interdigitation-type diffractive light modulator according to the first embodiment includes a substrate 100 and a pair of ribbons 110a and 110b.

The substrate 100 has a recess. Each ribbon 110a, 110b has a pair of support parts 111a and 111a', 111b and 111b' which are fastened to both sides of an upper surface of the substrate 100 other than the recess, so that the ribbon 110a, 110b is laid across the recess on the substrate 100 in a bridge shape. Here, the recess of the substrate 100 provides a space to allow an intermediate portion of the ribbon 110a or 110b to move upwards and downwards.

The substrate 100 is an insulated substrate, such as a glass substrate or a substrate which is made by forming an insulating layer on a semiconductor substrate, such as a silicon (Si) or gallium-arsenide (GaAs) substrate.

Furthermore, each ribbon 110a, 110b including the pair of support parts 111a and 111a', 111b and 111b' has a diffractive part 115a, 115b which is provided between the support parts 111a and 111a', 111b and 111b'.

The pair of support parts 111a and 111a', 111b and 111b' of each ribbon 110a, 110b are attached to both sides of the upper surface of the substrate 100 other than the recess, such that each ribbon 110a, 110b is suspended above the recess in a bridge shape.

The diffractive part 115a, 115b of each ribbon 110a, 110b has a connection part 112a, 112b and a plurality of diffractive branches 113a1~113a4, 113b1~113b4 which is arranged along a sidewall of the connection part 112a, 112b in a comb shape.

Here, the connection part 112a, 112b of each ribbon 110a, 110b serves to connect the support parts 111a and 111a', 111b and 111b' to each other such that the ribbon 110a, 110b is suspended above the recess in a bridge shape.

The diffractive branches 113a1~113a4 and 113b1~113b4, which are provided at predetermined positions along the intermediate portions of the connection parts 112a and 112b in a comb shape, interdigitate with each other. Ends of the diffractive branches 113a1~113a4, 113b1~113b4 of each ribbon 110a, 110b are adjacent to the connection part 112a, 112b of the opposite ribbon 110a, 110b.

Therefore, when the diffractive branches 113a1~113a4 and 113b1~113b4 have appropriate width and length, there is little gap between adjacent diffractive branches 113a1~113a4 and 113b1~113b4. As a result, reflection efficiency (or diffraction efficiency) of the ribbons with respect to incident light is improved.

Each of the diffractive branches 113a1~113a4 and 113b1~113b4 has a thin reflective layer on an upper surface thereof to reflect incident light. If either of the ribbons (for example, the ribbon designated as the reference numeral 110a) is defined as a fixed ribbon and the other ribbon 110b is defined as a movable ribbon, when the movable ribbon 110b moves upwards and downwards, height differences occur between the diffractive branches 113a1~113a4 of the fixed ribbon 110a and the diffractive branches 113b1~113b4 of the movable ribbon 110b (that is, between the diffractive branches 113a1 and 113b1, between the diffractive branches 113a2 and 113b2, between the diffractive branches 113a3 and 113b3, and between the diffractive branches 113a4 and 114b).

When a wavelength of incident light is denoted as λ, if the height difference becomes a multiple of λ/4, diffractive light occurs. When a wavelength of incident light is denoted as λ and a grating period of the incident light is denoted as Λ, a diffraction angle (θ) of the diffracted light is obtained from the following equation 1. The direction of the diffracted light is the same as the grating direction.

$$\theta \approx \lambda/\Lambda \quad \text{[Equation 1]}$$

In the present invention, electrostatic force, electromagnetic force and piezoelectric force can be used as actuating force to move the movable ribbon 110b upwards and downwards.

To use the electrostatic force, a lower electrode is required on a bottom of the recess of the substrate 100, and an upper electrode is required on the movable ribbon 110b.

To use the piezoelectric force, as shown in FIG. 4, a piezoelectric layer 120b, 120b' is required on each of opposite ends of the movable ribbon 110b.

Each piezoelectric layer 120b, 120b' has a lower electrode layer 121b, 121b' which is placed on each support part 111b, 111b' of the movable ribbon 110b, and a piezoelectric material layer 122b, 122b' which is layered on the lower electrode layer 121b, 121b'. Each piezoelectric layer 120b, 120b' further has an upper electrode layer 123b, 123b' which is layered on the piezoelectric material layer 122b, 122b'.

Here, an end of each piezoelectric layer 120b, 120b' must be placed over the recess of the substrate 100.

When a voltage is applied to the upper and lower electrode layers 123b, 123b', 121b and 121b' which are provided on and under the piezoelectric material layers 122b and 122b', the piezoelectric material layers 122b and 122b' shrink in a lengthwise direction. At this time, because ends of the piezoelectric material layers 122b and 122b' are also placed over the recess of the substrate 100, the piezoelectric layers 120b and 120b' generate a vertical actuating force, thus moving the intermediate portion of the movable ribbon 110b upwards and downwards.

Figure 5A:
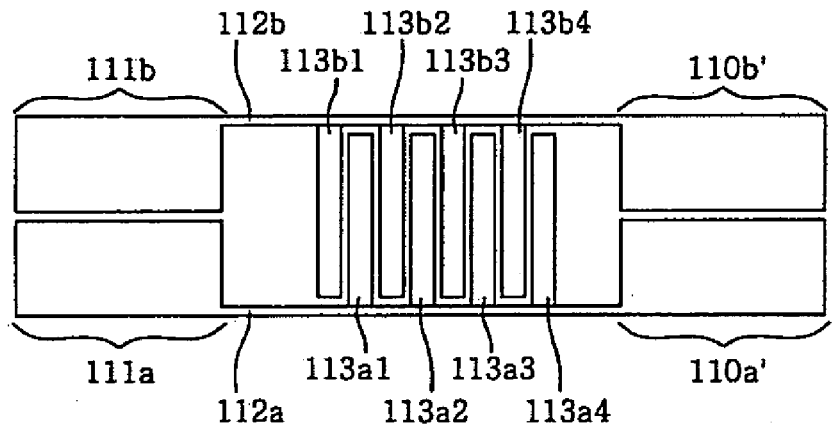
FIG. 5a is a plan view of the interdigitation-type diffractive light modulator of FIG. 4.

FIG. 5a is a plan view of the interdigitation-type diffractive light modulator of FIG. 4. FIGS. 5b through 5k are sectional views showing stationary states and actuated states of the interdigitation-type diffraction light modulator of FIG. 4.

FIG. 5a is the plan view of the interdigitation-type diffractive light modulator of FIG. 4 to illustrate the interdigitation of the diffractive branches 113a1~113a4 and 113b1~113b4 of the diffractive parts 115a and 115b of the ribbons 110a and 110b which have the comb shapes. As shown in FIG. 5a, if the width and length of the diffractive branches 113a1~113a4 and 113b1~113b4 are appropriately adjusted, the interdigitation-type diffractive light modulator may be manufactured such that there is little gap between the diffractive branches 113a1~113a4 and 113b1~113b4. When either of the ribbons (for example, the ribbon the reference numeral of which is 110b) serves as the movable ribbon while the other ribbon 11a serves as the fixed ribbon, the diffractive branches 113a1~113a4 and 113b1~113b4 of the ribbons 110a and 110b form a stepped structure, thus diffracting incident light.

Figure 5B:
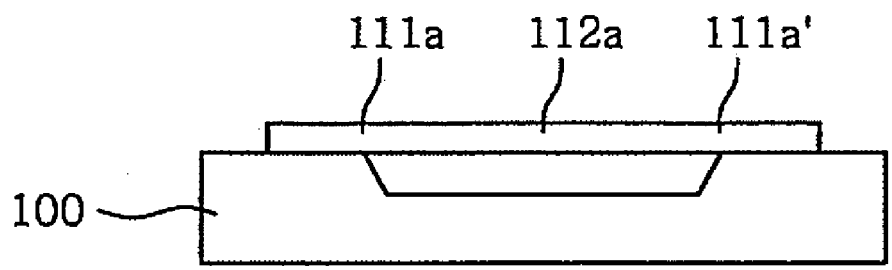
FIGS. 5b through 5k are sectional views showing stationary states and actuated states of the interdigitation-type diffraction light modulator of FIG. 4.
Figure 5C:
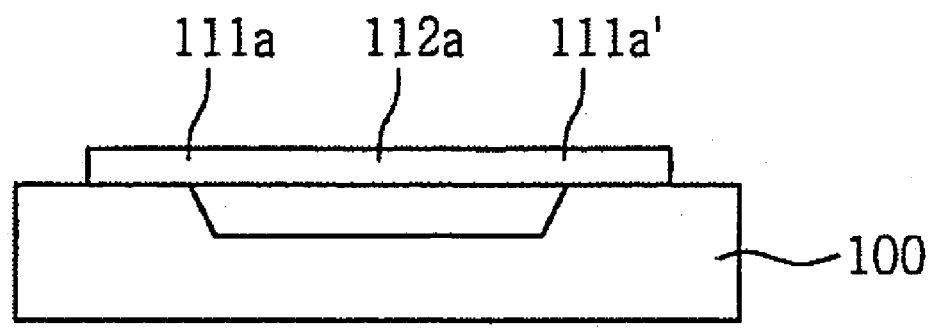

FIGS. 5b and 5c are sectional views taken along the line A-A' of FIG. 4. FIG. 5b is a sectional view showing the fixed ribbon 110a in reflection mode to reflect incident light. FIG. 5c is a sectional view showing the fixed ribbon 110a in diffraction mode to diffract incident light. As shown in FIGS. 5b and 5c, the ribbon 110a is laid across the recess of the substrate 100 in a bridge shape. Because the ribbon 110a acts as a fixed ribbon, the ribbon 110a maintains a linear state in the diffraction mode as well as in the reflection mode.

Figure 5D:
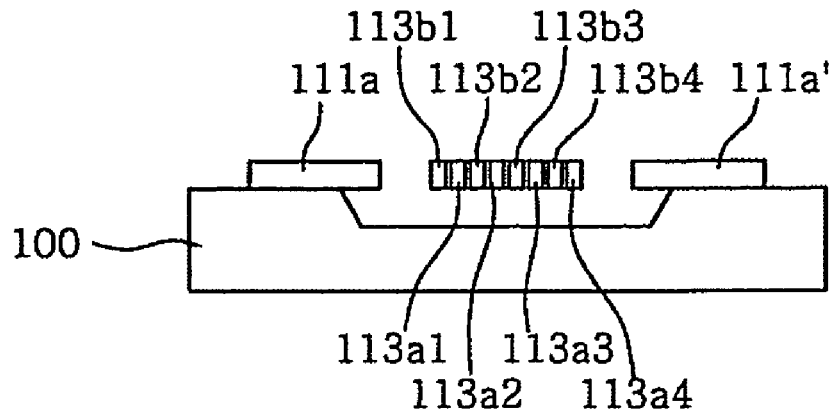
Figure 5E:
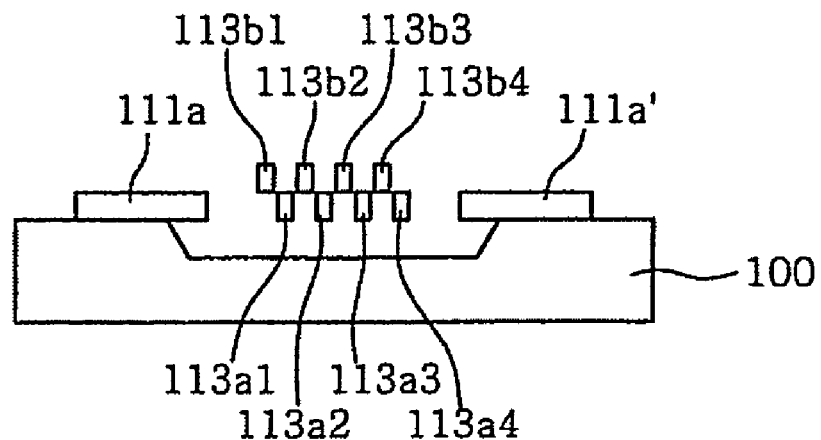

FIGS. 5d and 5e are sectional views taken along the line B-B' of FIG. 4. FIG. 5d shows a state in which, when the interdigitation-type diffractive light modulator is in the reflection mode to reflect incident light, the diffractive branches 113a1~113a4 of the fixed ribbon 110a and the diffractive branches 113b1~113b4 of the movable ribbon 110b are in the same plane without being stepped. FIG. 5e shows a state in which, when the interdigitation-type diffractive light modulator is in the diffraction mode, the diffractive branches 113b1~113b4 of the movable ribbon 10b move upwards while the diffractive branches 113a1~113a4 of the fixed ribbon 110a do not move, thus forming a stepped structure, thereby diffracting incident light.

Figure 5F:
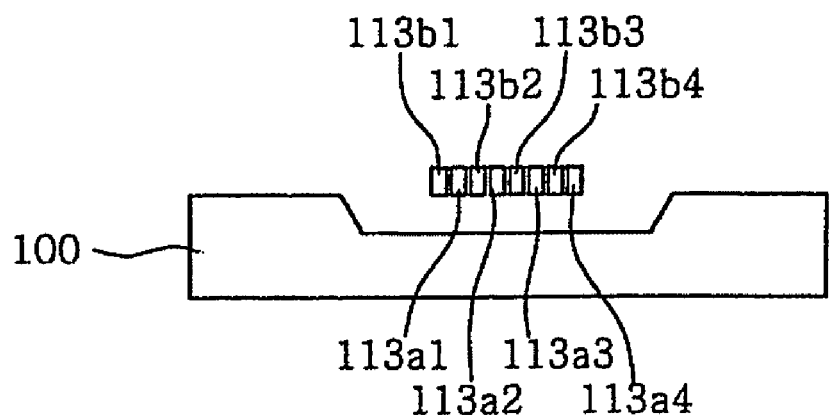
Figure 5G:
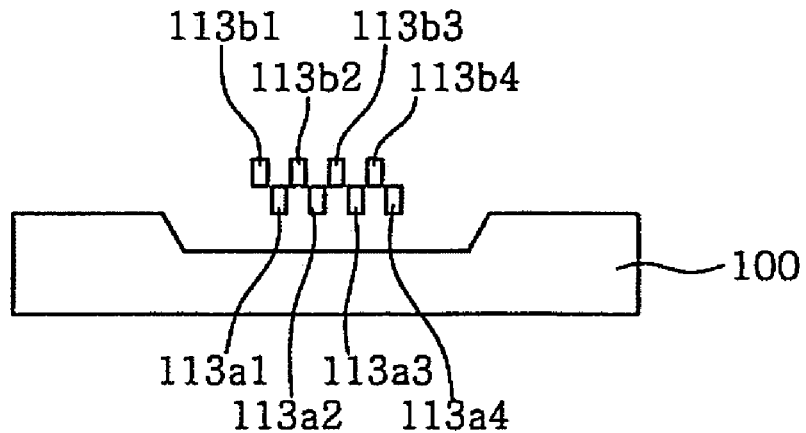

FIGS. 5f and 5g are sectional views taken along the line C-C' of FIG. 4. FIG. 5f shows a state in which, while in the reflection mode to reflect incident light, the diffractive branches 113a1~113a4 of the fixed ribbon 110a and the diffractive branches 113b1~113b4 of the movable ribbon 110b are in the same plane without being stepped. FIG. 5g shows a state in which, while in the diffraction mode, the diffractive branches 113b1~113b4 of the movable ribbon 110b move upwards while the diffractive branches 113a1~113a4 of the fixed ribbon 110a do not move, thus forming a stepped structure, thereby diffracting incident light.

Figure 5H:
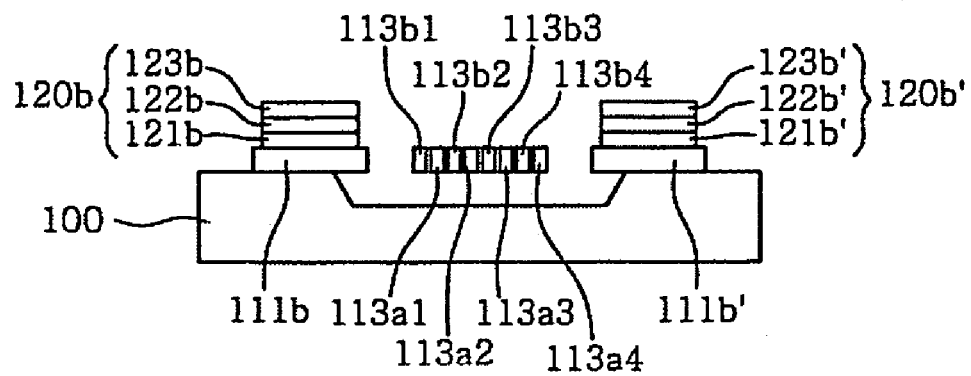
Figure 5I:
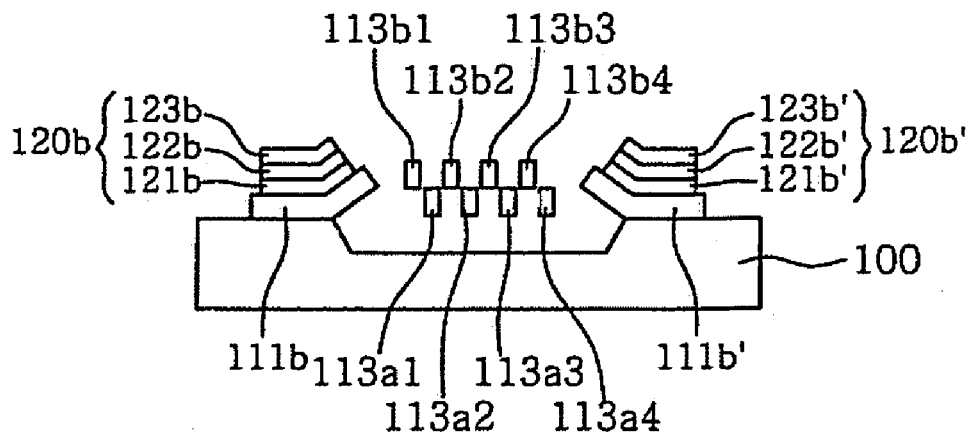

FIGS. 5h and 5i are sectional views taken along the line D-D' of FIG. 4. FIG. 5h shows a state in which, when the interdigitation-type diffractive light modulator is in the reflection mode to reflect incident light, the diffractive branches 113a1~113a4 of the fixed ribbon 110a and the diffractive branches 113b1~113b4 of the movable ribbon 110b are in the same plane without being stepped. FIG. 5i shows a state in which, when the interdigitation-type diffractive light modulator is in the diffraction mode, the diffractive branches 113b1~113b4 of the movable ribbon 110b move upwards while the diffractive branches 113a1~113a4 of the fixed ribbon 110a do not move, thus forming a stepped structure, thereby diffracting incident light.

In particular, FIGS. 5h and 5i illustrate a process in which the movable ribbon 110b moves upwards and downwards by shrinking the piezoelectric layers 120b and 120b' which are respectively placed on the support parts 111b and 111b' positioned at the opposite ends of the movable ribbon 110b.

Figure 5J:
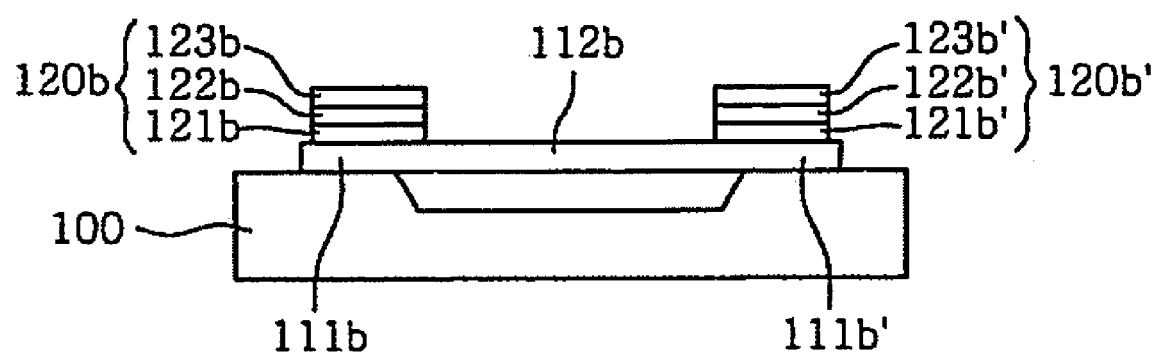
Figure 5K:
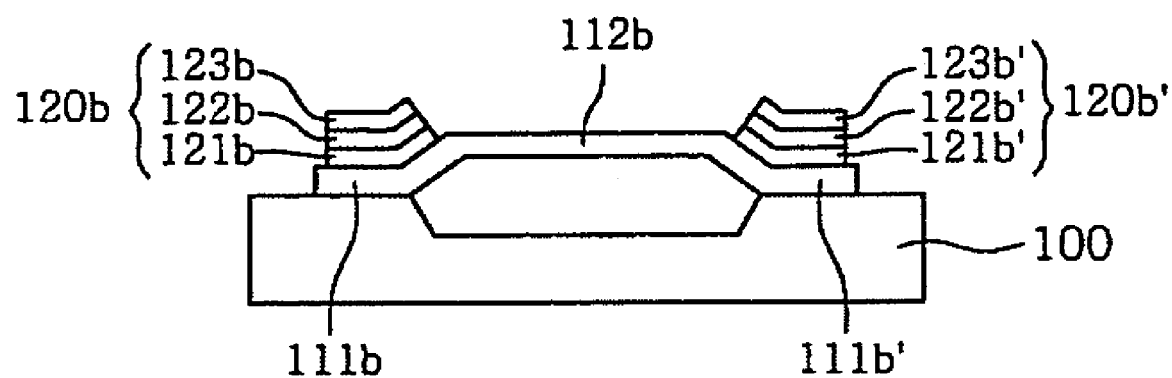

FIGS. 5j and 5k are sectional views taken along the line E-E' of FIG. 4. FIG. 5j shows the connection part 112b of the movable ribbon 110b maintaining a linear state while in the reflection mode to reflect incident light. FIG. 5k shows the connection part 112b, the intermediate portion of which moves upwards while in the diffraction mode to diffract incident light.

Figure 6:
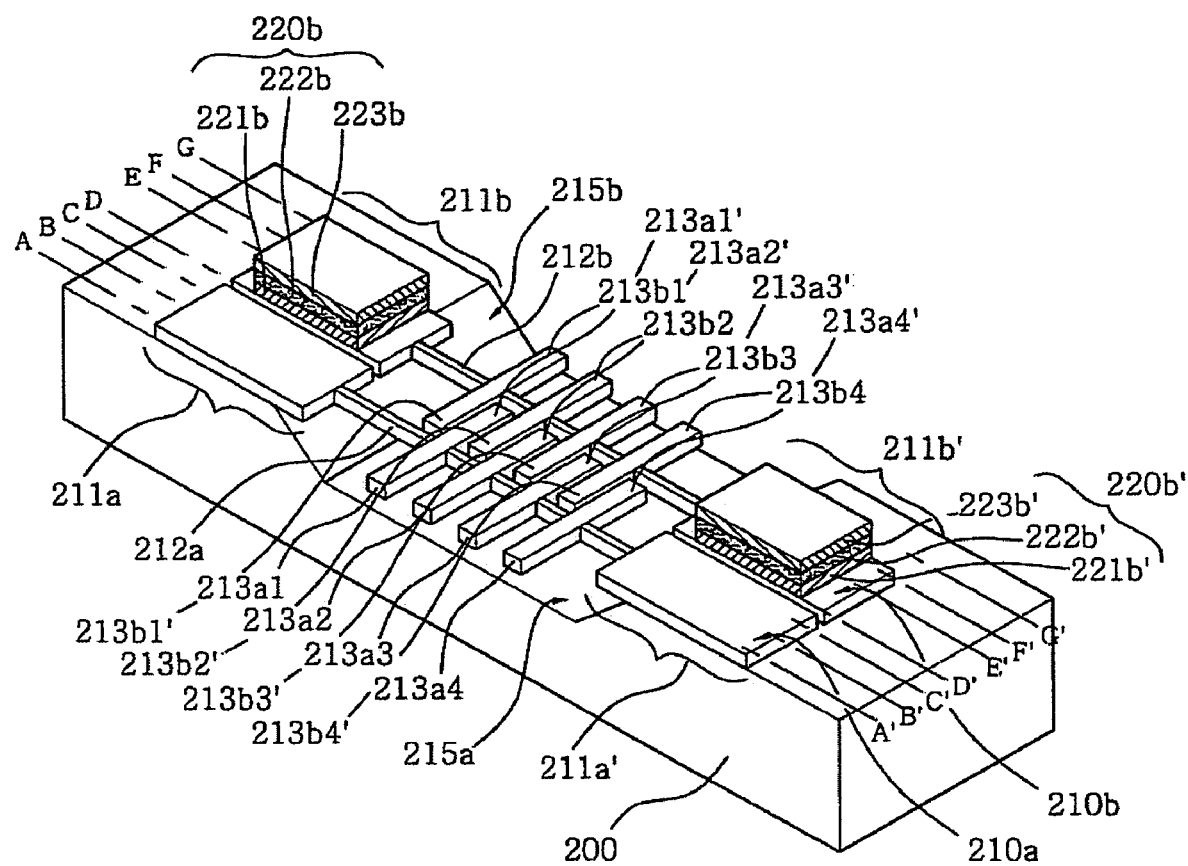
FIG. 6 is a perspective view of an interdigitation-type diffractive light modulator, according to a second embodiment of the present invention.

FIG. 6 is a perspective view of an interdigitation-type diffractive light modulator, according to a second embodiment of the present invention.

Referring to FIG. 6, the interdigitation-type diffractive light modulator according to the second embodiment includes a substrate 200 having a recess, and a pair of ribbons 210a and 210b each of which includes a diffractive part 215a, 215b having a fishbone shape.

Each ribbon 210a, 210b has a pair of support parts 211a and 211a', 211b and 211b' which are fastened to both sides of an upper surface of the substrate 200 other than the recess so that the ribbon 210a, 210b is laid across the recess on the substrate 200 in a bridge shape. Here, the recess of the substrate 200 provides a space to allow an intermediate portion of the ribbon 210a or 210b to move upwards and downwards.

As such, each ribbon 210a, 210b has the pair of support parts 211a and 211a', 211b and 211b' and the diffractive part 215a, 215b which has a fishbone shape and is provided between the support parts 211a and 211a', 211b and 211b'.

The pair of support parts 211a and 211a', 211b and 211b' of each ribbon 210a, 210b are attached to both sides of the upper surface of the substrate 200 other than the recess, such that each ribbon 210a, 210b is suspended above the recess in a bridge shape.

The diffractive part 215a, 215b of each ribbon 210a, 210b has a connection part 212a, 212b and a plurality of diffractive branches 213a1~213a4, 213a1'~213a4', 213b1~213b4, 213b1'~213b4' which is arranged along both sidewalls of the connection part 212a, 212b in a comb shape.

Here, the connection part 212a, 212b of each ribbon 210a, 210b serves to connect the support parts 211a and 211a', 211b and 211b' to each other such that the ribbon 210a, 210b is suspended above the recess in a bridge shape.

Parts of the diffractive branches 213a1~213a4, 213a1'~213a4', 213b1~213b4, 213b1'~213b4' of the pair of ribbons 210a and 210b which protrude toward each other from the intermediate portions of the connection parts 212a and 212b interdigitate with each other. That is, as shown in FIG. 6, the diffractive branches 213a1'~1213a4' of the ribbon 210a interdigitate with the diffractive branches 213b1~213b4 of the ribbon 210b. Here, each of ends of the diffractive branches 213a1'~1213a4' and 213b1~213b4 of the ribbon 210a and 210b are adjacent to the connection part 212a, 212b of the opposite ribbon 210a, 210b.

When the diffractive branches 213a1'~213a4' and 213b1~213b4 have appropriate width and length, there is little gap between adjacent diffractive branches 213a1'~213a4' and 213b1~213b4. Therefore, diffraction efficiency of the ribbons 210a and 210b with respect to incident light is improved.

Each of the diffractive branches 213a1~213a4, 213a1'~213a4', 213b1~213b4 and 213b1'~213b4' has a thin reflective layer on an upper surface thereof to reflect incident light. If either of the ribbons (for example, the ribbon designated as the reference numeral 210a) is defined as a fixed ribbon and the other ribbon 210b is defined as a movable ribbon, when the movable ribbon 210b moves upwards and downwards, height differences occur between the diffractive branches 213a1'~213a4' of the fixed ribbon 210a and the diffractive branches 213b1~213b4 of the movable ribbon 210b (that is, between the diffractive branches 213a1' and 213b1, between the diffractive branches 213a2' and 213b2, between the diffractive branches 213a3' and 213b3, and between the diffractive branches 213a4' and 214b).

When a wavelength of incident light is denoted as λ, if the height difference becomes a multiple of λ/4, diffractive light occurs.

In the present invention, electrostatic force, electromagnetic force and piezoelectric force can be used as actuating force to move the movable ribbon 210b upwards and downwards.

To use the electrostatic force, a lower electrode is required on a bottom of the recess of the substrate 200, and an upper electrode is required on the movable ribbon 210b.

To use the piezoelectric force, as shown in FIG. 6, a piezoelectric layer 220b, 220b' is required on each of opposite ends of the movable ribbon 210b.

Each piezoelectric layer 220b, 220b' has a lower electrode layer 221b, 221b' which is placed on each support part 211b, 211b' of the movable ribbon 210b, and a piezoelectric material layer 222b, 222b' which is layered on the lower electrode layer 221b, 221b'. Each piezoelectric layer 220b, 220b' further has an upper electrode layer 223b, 223b' which is layered on the piezoelectric material layer 222b, 222b'.

Here, an end of each piezoelectric layer 220b, 220b' must be placed over the recess of the substrate 200.

When voltage is applied to the upper and lower electrode layers 223b, 223b', 221b and 221b' which are provided on and under the piezoelectric material layers 222b and 222b', the piezoelectric material layers 222b and 222b' shrink in a lengthwise direction. At this time, because ends of the piezoelectric material layers 222b and 222b' are also placed over the recess of the substrate 200, the piezoelectric layers 220b and 220b' generate a vertical actuating force, thus moving the intermediate portion of the movable ribbon 210b upwards and downwards.

Figure 7A:
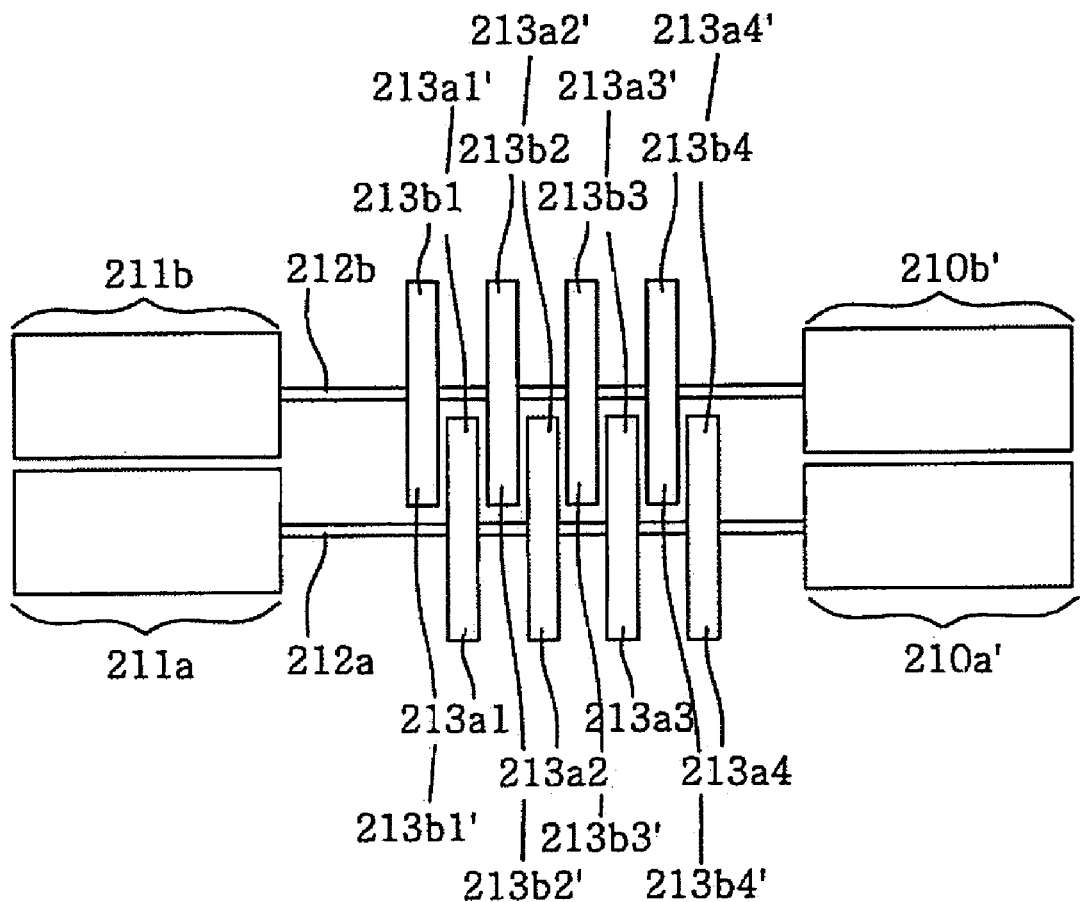
FIG. 7a is a plan view of the interdigitation-type diffractive light modulator of FIG. 6.
Figure 7B:
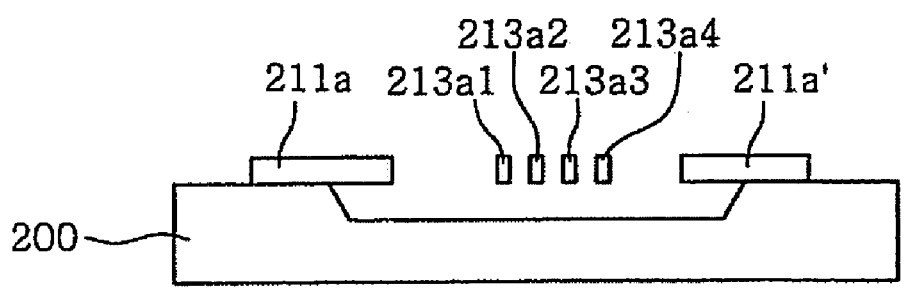
FIGS. 7b through 7o are sectional views showing stationary states and actuated states of the interdigitation-type diffraction light modulator of FIG. 6.

FIG. 7a is a plan view of the interdigitation-type diffractive light modulator of FIG. 6. FIGS. 7b through 7o are sectional views showing stationary states and actuated states of the interdigitation-type diffraction light modulator of FIG. 6.

FIG. 7a is the plan view of the interdigitation-type diffractive light modulator of FIG. 6, in which the interdigitation between the diffractive branches 213a1'~213a4', which are arranged on an inner sidewall of the connection part 212a of the diffractive part 215a that is provided in the fixed ribbon 210a in a fishbone shape, interdigitate with the diffractive branches 213b1~213b4, which are arranged on an inner sidewall of the connection part 212b of the movable ribbon 210b.

Figure 7C:
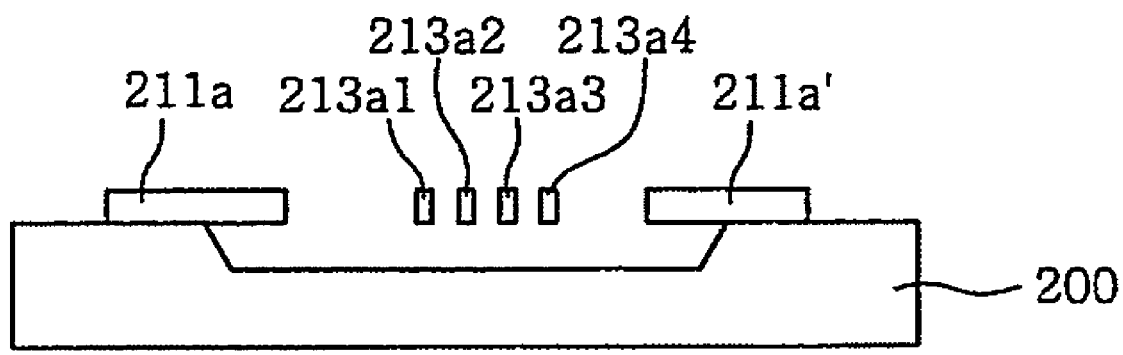

FIGS. 7b and 7c are sectional views taken along the line A-A' of FIG. 6. FIG. 7b is a sectional view showing the diffractive parts 213a1~213a4, which are placed at an outer sidewall of the fixed ribbon 210a, while in reflection mode to reflect incident light. FIG. 7c is a sectional view showing that, while in diffraction mode to diffract incident light, the diffractive parts 213a1~213a4 of the fixed ribbon 210a are stationary.

Figure 7D:
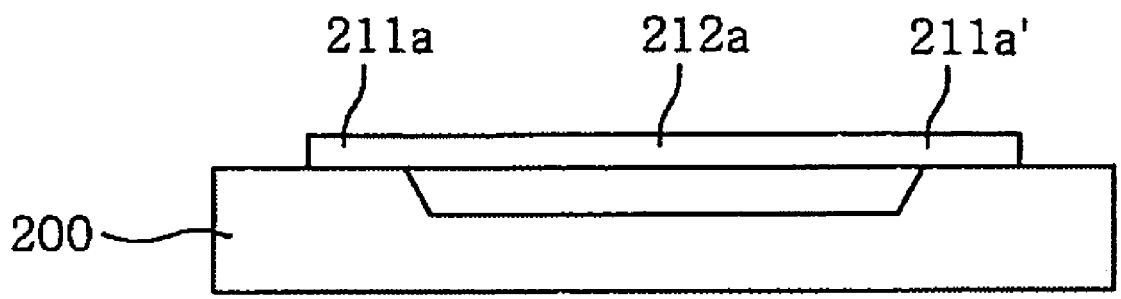
Figure 7E:
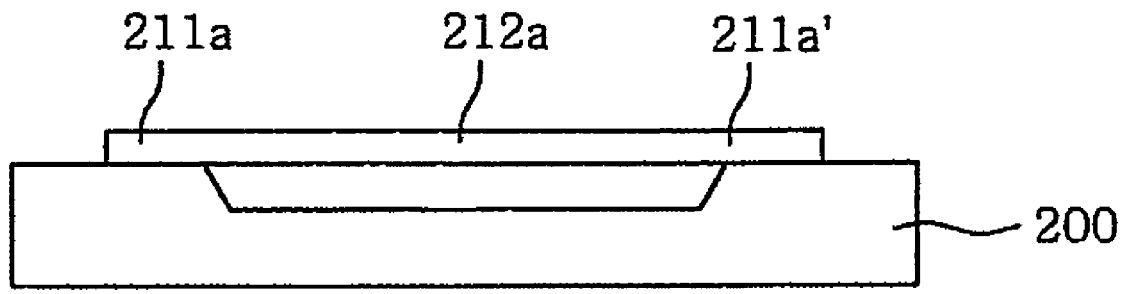

FIGS. 7d and 7e are sectional views taken along the line B-B' of FIG. 6. FIG. 7d shows a horizontal state of the connection part 212a of the fixed ribbon 210a while in the reflection mode. FIG. 7e shows that the connection part 212a of the fixed ribbon 210a maintains the horizontal state while in the diffraction mode.

Figure 7F:
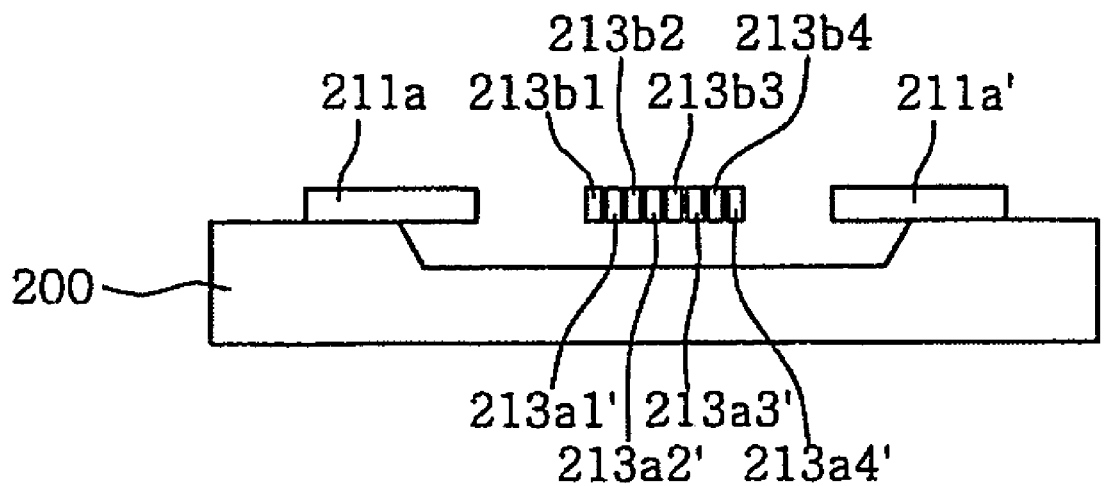
Figure 7G:
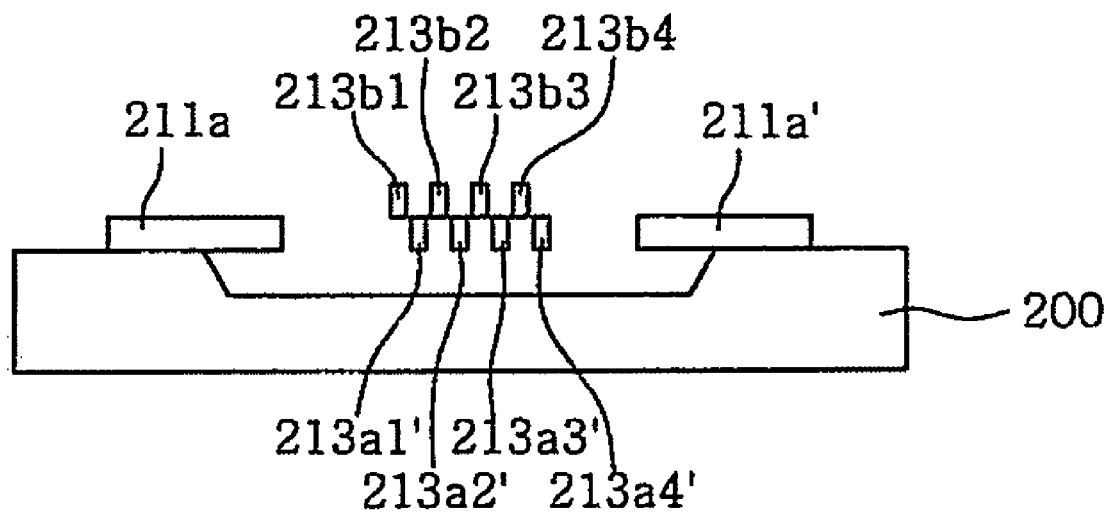

FIGS. 7f and 7g are sectional views taken along the line C-C' of FIG. 6. FIG. 7f shows a state in which, when the interdigitation-type diffractive light modulator is in the reflection mode to reflect incident light, the diffractive branches 213a1'~213a4', provided on the inner sidewall of the connection part 212a of the fixed ribbon 210a, and the diffractive branches 213b1~213b4, provided on the inner sidewall of the connection part 212b of the movable ribbon 210b, are in the same plane without being stepped. FIG. 7g shows a state in which, when the interdigitation-type diffractive light modulator is in the diffraction mode, the diffractive branches 213b1~213b4, provided on the inner sidewall of the connection part 212b of the movable ribbon 210b, move upwards while the diffractive branches 213a1'~213a4', provided on the inner sidewall of the connection part 212a of the fixed ribbon 210a, do not move, thus forming a stepped structure, thereby diffracting incident light.

Figure 7H:
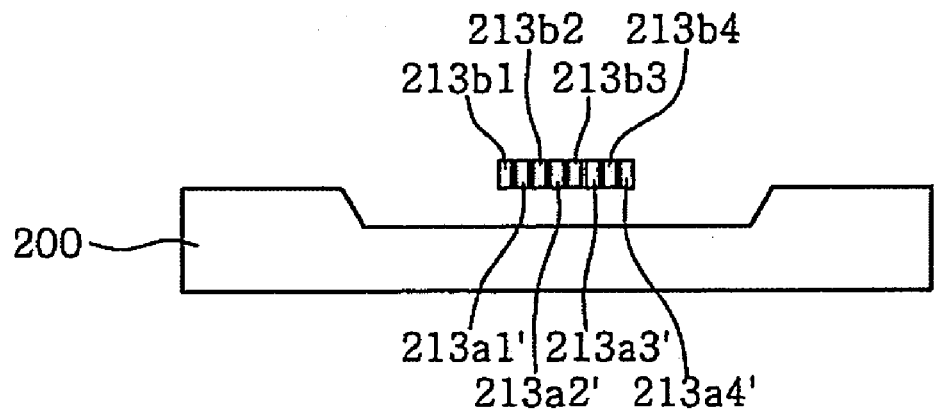
Figure 7I:
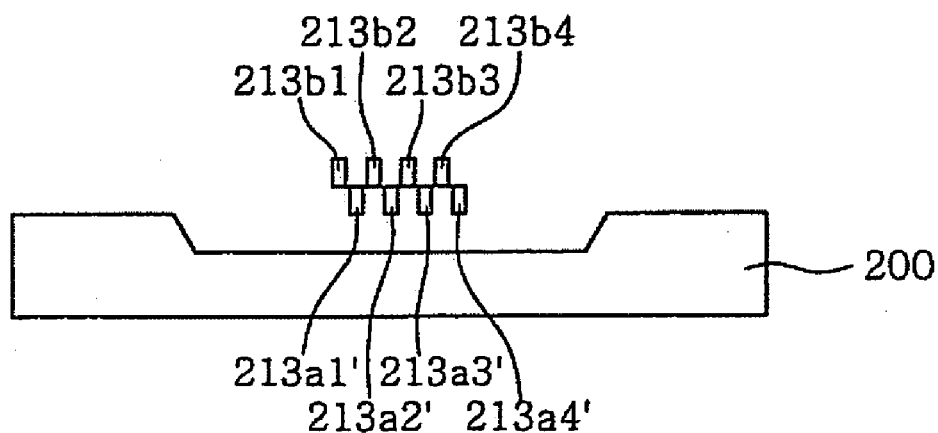

FIGS. 7h and 7i are sectional views taken along the line D-D' of FIG. 6. FIG. 7h shows a state in which, while in the reflection mode to reflect incident light, the diffractive branches 213a1'~213a4' of the fixed ribbon 210a and the diffractive branches 213b1~213b4 of the movable ribbon 210b are in the same plane without being stepped. FIG. 7i shows a state in which, while in the diffraction mode, the diffractive branches 213b1~213b4 of the movable ribbon 210b move upwards while the diffractive branches 213a1'~213a4' of the fixed ribbon 210a do not move, thus forming a stepped structure, thereby diffracting incident light.

Figure 7J:
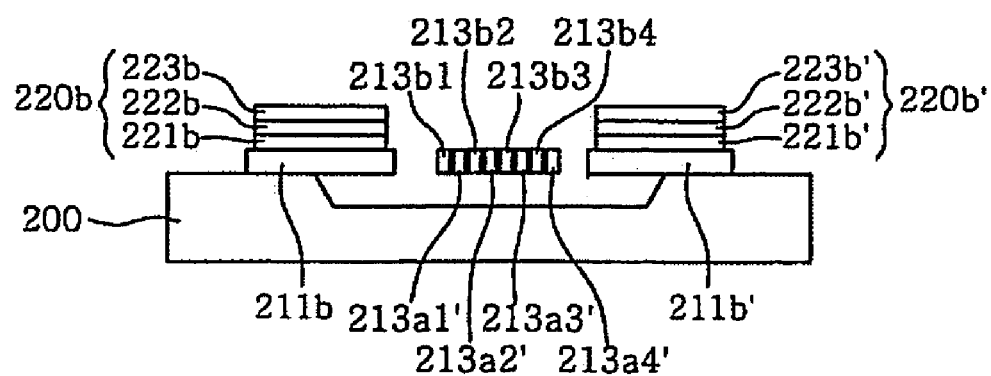
Figure 7K:
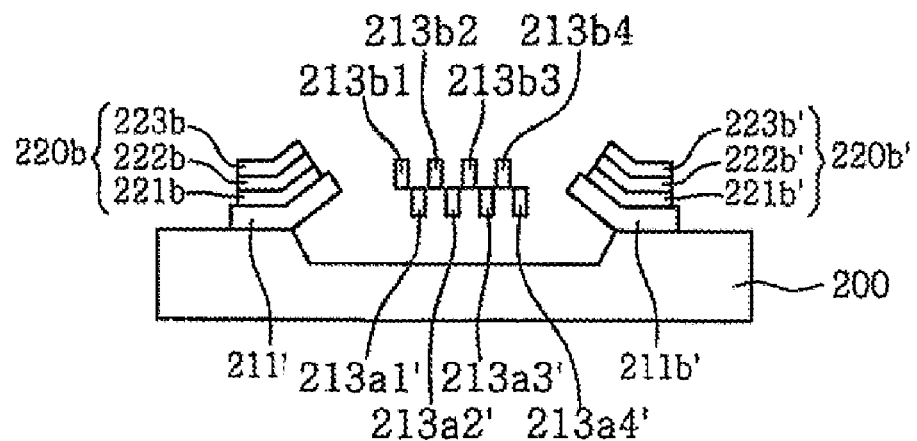

FIGS. 7j and 7k are sectional views taken along the line E-E' of FIG. 6. FIG. 7j shows a state in which, while in the reflection mode to reflect incident light, the diffractive branches 213a1'~213a4' of the fixed ribbon 210a and the diffractive branches 213b1~213b4 of the movable ribbon 210b are in the same plane without being stepped. FIG. 7k shows a state in which, while in the diffraction mode, the diffractive branches 213b1~213b4 of the movable ribbon 210b move upwards while the diffractive branches 213a1'~213a4' of the fixed ribbon 210a do not move, thus forming a stepped structure, thereby diffracting incident light.

In particular, FIGS. 7j and 7k illustrate a process in which the movable ribbon 210b move upwards and downwards by shrinking the piezoelectric layers 220b and 220b' which are respectively placed on the support parts 211b and 211b' positioned at the opposite ends of the movable ribbon 210b.

Figure 7L:
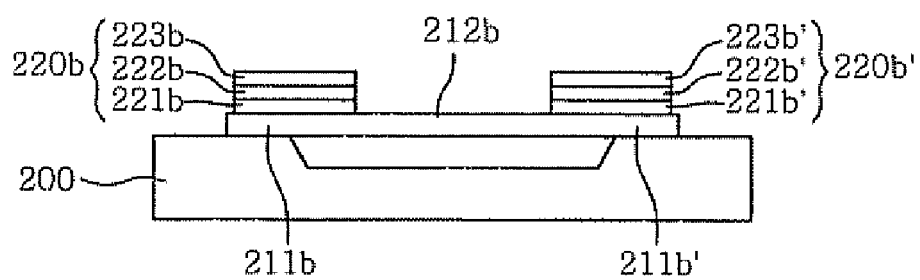
Figure 7M:
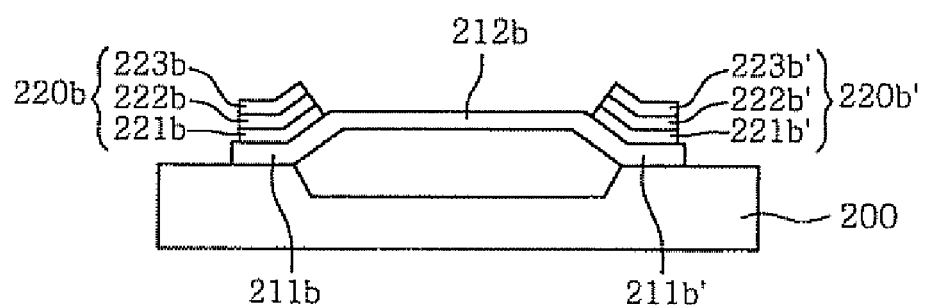

FIGS. 7l and 7m are sectional views taken along the line F-F' of FIG. 6. FIG. 7l shows the connection part 212b of the movable ribbon 210b maintaining a horizontal state while in reflection mode to reflect incident light. FIG. 7m shows the connection part 212b moved upwards while in the diffraction mode to diffract incident light.

Figure 7N:
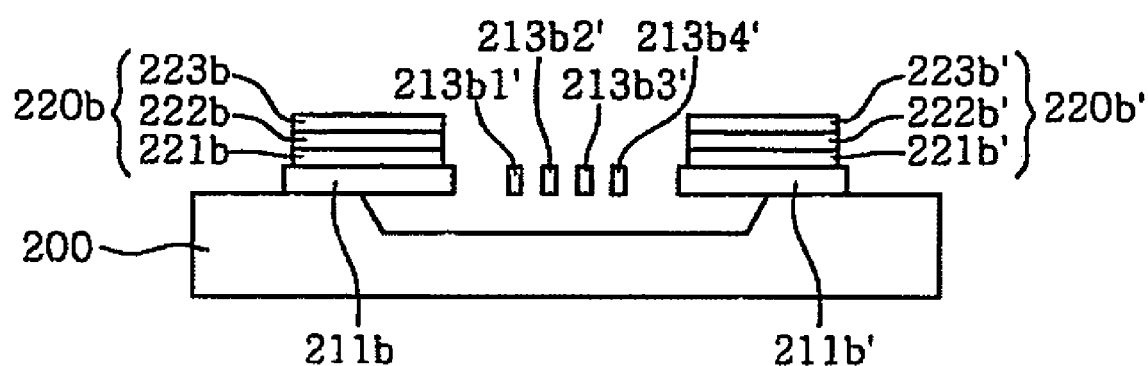
Figure 7O:
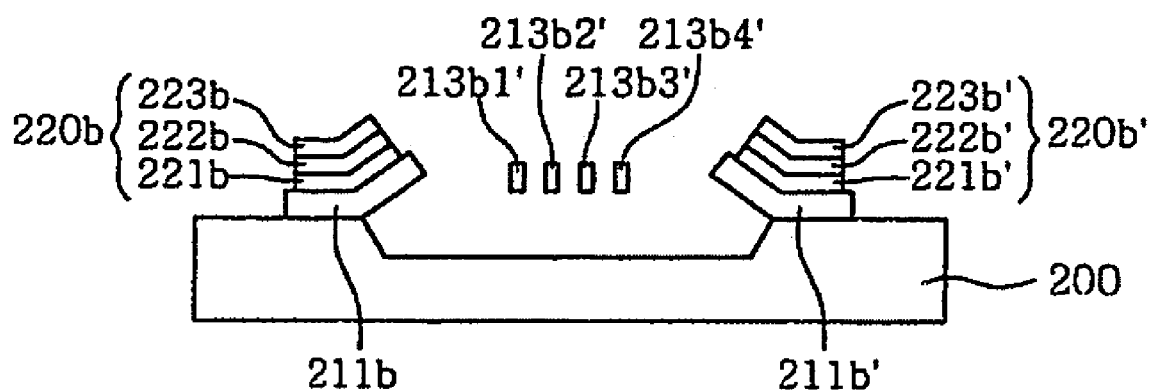

FIGS. 7n and 7o are sectional views taken along the line G-G' of FIG. 6. FIG. 7n shows the diffractive branches 213b1'~213b4' of the movable ribbon 210b maintaining a horizontal state while in the reflection mode to reflect incident light. FIG. 7o shows the diffractive branches 213b1'~213b4' of the movable ribbon 210b which move upwards while in the diffraction mode to diffract incident light.

Figure 8A:
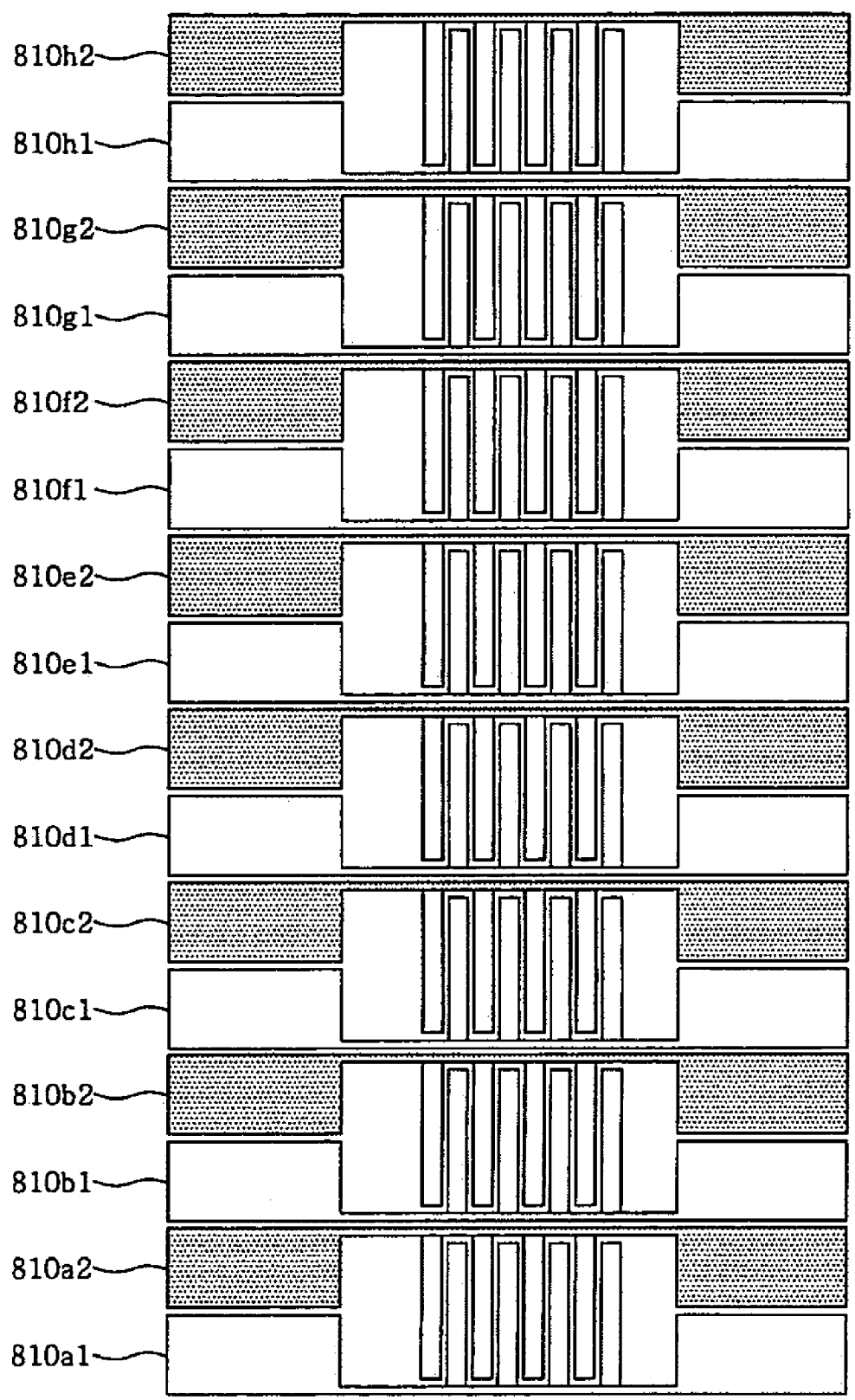
FIG. 8a is a plan view showing a light modulator array using a plurality of interdigitation-type diffractive light modulators according to the first embodiment of the present invention.

FIG. 8a is a plan view showing a light modulator array using a plurality of interdigitation-type diffractive light modulators according to the first embodiment of the present invention. As shown in FIG. 8a, a plurality of fixed ribbons 810a1~810h1 and a plurality of movable ribbons 810a2~810h2 are alternately arranged. It is understood that one fixed ribbon and an adjacent movable ribbon form one pixel.

In the light modulator array using the interdigitation-type diffractive light modulators according to the first embodiment, there is little gap in a region onto which light is incident, thus increasing diffraction efficiency with respect to the incident light.

Figure 8B:
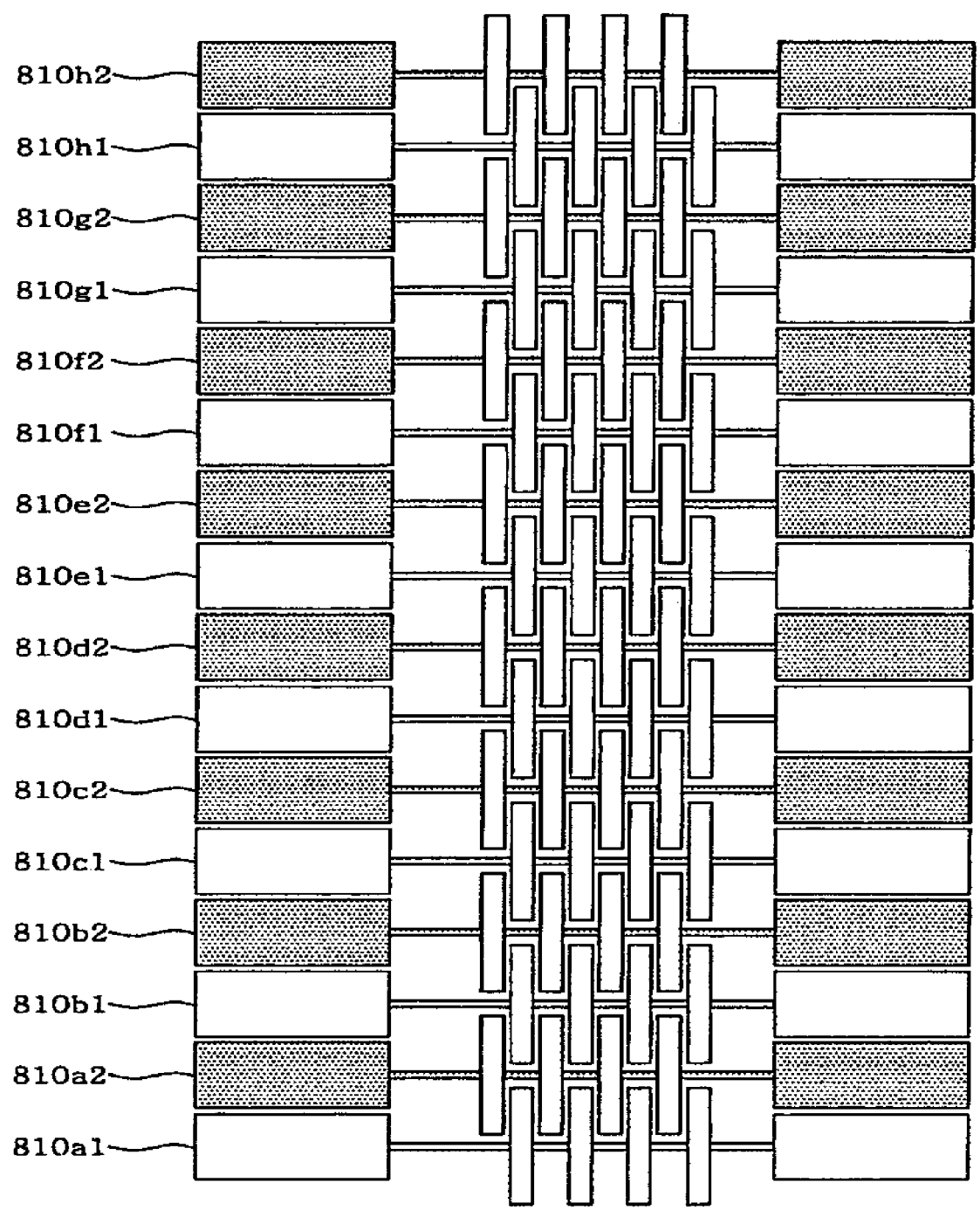
FIG. 8b is a plan view showing another light modulator array using a plurality of interdigitation-type diffractive light modulators according to the second embodiment of the present invention.

FIG. 8b is a plan view showing another light modulator array using a plurality of interdigitation-type diffractive light modulators according to the second embodiment of the present invention. As shown in FIG. 8a, a plurality of fixed ribbons 810a1~810h1 and a plurality of movable ribbons 810a2~810h2 are alternately arranged. It is understood that a part of one fixed ribbon and a part of an adjacent movable ribbon form one pixel.

Alternatively, in the light modulator array using the interdigitation-type diffractive light modulators according to the second embodiment, diffractive branches, which are arranged at a side of one fixed ribbon, diffractive branches, which are arranged at both sides of an adjacent movable ribbon, and diffractive branches, which are arranged at a side of another adjacent fixed ribbon, may form one pixel. As a result, diffraction efficiency is improved.

Of course, in the light modulator array using the interdigitation-type diffractive light modulators according to the second embodiment, because diffractive branches are close to each other, there is little gap in a region onto which light is incident. Therefore, the light modulator array using the second embodiment can markedly reduce light loss.

In the first and second embodiments of the present invention, piezoelectric force is used to provide a vertical actuating force to the interdigitation-type diffractive light modulator. However, electrostatic or electromagnetic force may be used as a vertical actuating force for the interdigitation-type diffractive light modulator.

In the case in which electrostatic force is used as a vertical actuating force for the interdigitation-type diffractive light modulator, one layer of a ribbon is embodied as a first electrode layer. A second electrode layer is provided over or below the ribbon (in the case of the second electrode layer provided below the ribbon, it is preferred that the second electrode layer be placed in a recess of the ribbon). Thus, when a voltage is applied to the first and second electrode layers, the ribbon is moved upwards and downwards by electrostatic force, thus being convex or concave. When a voltage is cut off, the ribbon is returned to the initial horizontal state by a restoring force.

In the case in which electromagnetic force is used as a vertical actuating force for the interdigitation-type diffractive light modulator, a first electromagnetic force generating unit is provided on a ribbon. A second electromagnetic force generating unit is provided over or below the ribbon, so that the ribbon is moved upwards and downwards by attraction and repulsion between the first and second electromagnetic force generating units.

In the meantime, in the first and second embodiments using piezoelectric force, the actuating unit having a single piezoelectric material layer has been explained. However, multiple piezoelectric material layers may be used. In detail, the actuating unit may have a structure in which a first piezoelectric material layer is placed on a lower electrode layer, and an intermediate electrode layer is laminated on the first piezoelectric material layer, and, consecutively, a second piezoelectric material layer is placed on the intermediate electrode layer, and an upper electrode layer is laminated on the second piezoelectric material layer.

As described above, the present invention provides an interdigitation-type diffractive light modulator which is able to enhance diffraction efficiency despite using only one pair of ribbons each having a plurality of diffractive branches, that is, four or more diffractive branches.

Furthermore, in the present invention, light is diffracted towards the diffractive branches of the pair of ribbons. Therefore, when the ribbons are linearly arranged, because the light is diffracted in a direction perpendicular to the ribbon arrangement direction, a zero order diffraction and a first order diffraction are easily distinguished.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An interdigitation-type diffractive light modulator, comprising:
    a substrate;
    a pair of ribbons each having a bar shape, each of the ribbons being suspended at an intermediate portion thereof above the substrate to define a gap between said intermediate portion and the substrate and comprising: a plurality of diffractive branches arranged along the intermediate portion of each of the ribbons in a comb shape such that the diffractive branches of the pair of ribbons forming the comb shapes interdigitate with each other, with a reflective surface provided on an upper surface of each of the diffractive branches; and
    an actuating unit to move the intermediate portion of either of the pair of ribbons located above the gap upwards and downwards, so that the diffractive branches of the ribbon, which interdigitate with the diffractive branches of a remaining ribbon, move in unison between a first position to reflect incident light and a second position to diffract incident light.

2. The interdigitation-type diffractive light modulator as set forth in claim 1, wherein each of the ribbons comprises:
    a diffractive part provided on the intermediate portion of the ribbon and having the diffractive branches arranged in the comb shape, with a reflective surface provided on an upper surface of the diffractive part, the diffractive part interdigitating with the diffractive branches of an adjacent ribbon; and
    a pair of support parts to support the diffractive part therebetween such that the diffractive part is spaced apart from and suspended above the substrate.

3. The interdigitation-type diffractive light modulator as set forth in claim 1, wherein the actuating unit comprises:
    a first electrode layer provided on the ribbon; and
    a second electrode layer provided over or below the ribbon, so that, when a voltage is applied to the first and second electrode layers, the first electrode layer is moved upwards and downwards by an electrostatic force, thus moving the ribbon upwards and downwards, thereby generating diffracted light.

4. The interdigitation-type diffractive light modulator as set forth in claim 1, wherein the actuating unit comprises:
    a first electromagnetic force generating unit provided on the ribbon; and
    a second electromagnetic force generating unit provided above or below the ribbon, so that the ribbon is moved upwards and downwards by an electromagnetic force, which is generated by an applied voltage, thus diffracting incident light.

5. An interdigitation-type diffractive light modulator, comprising:
    a substrate;
    a pair of ribbons each having a bar shape, each of the ribbons being suspended at an intermediate portion thereof above the substrate and comprising: a plurality of diffractive branches arranged along the intermediate portion of each of the ribbons in a comb shape such that the diffractive branches of the pair of ribbons forming the comb shapes interdigitate with each other, with a reflective surface provided on an upper surface of each of the diffractive branches;
    an actuating unit to move the intermediate portion of either of the pair of ribbons upwards and downwards, so that the diffractive branches of the ribbon, which interdigitate with the diffractive branches of a remaining ribbon, move between a first position to reflect incident light and a second position to diffract incident light; and
    wherein the actuating unit comprises:
        a first piezoelectric layer placed at a first end thereof on a first end of the ribbon attached to the substrate and placed at a second end thereof on a first end of the intermediate portion of the ribbon which is spaced apart from and suspended above the substrate, the first piezoelectric layer comprising a first piezoelectric material layer to generate a vertical actuating force by shrinking and expanding when a voltage is applied to the first piezoelectric material layer; and
        a second piezoelectric layer placed at a first end thereof on a second end of the ribbon attached to the substrate and placed at a second end thereof on a second end of the intermediate portion of the ribbon which is spaced apart from and suspended above the substrate, the second piezoelectric layer comprising a second piezoelectric material layer to generate a vertical actuating force by shrinking and expanding when a voltage is applied to the second piezoelectric material layer.

6. The interdigitation-type diffractive light modulator as set forth in claim 5, wherein each of the first and second piezoelectric layers comprises multiple piezoelectric material layers.

* * * * *